No. 828,674. PATENTED AUG. 14, 1906.
F. B. MAYNARD.
APPARATUS FOR MAKING COFFEE.
APPLICATION FILED JULY 3, 1905.
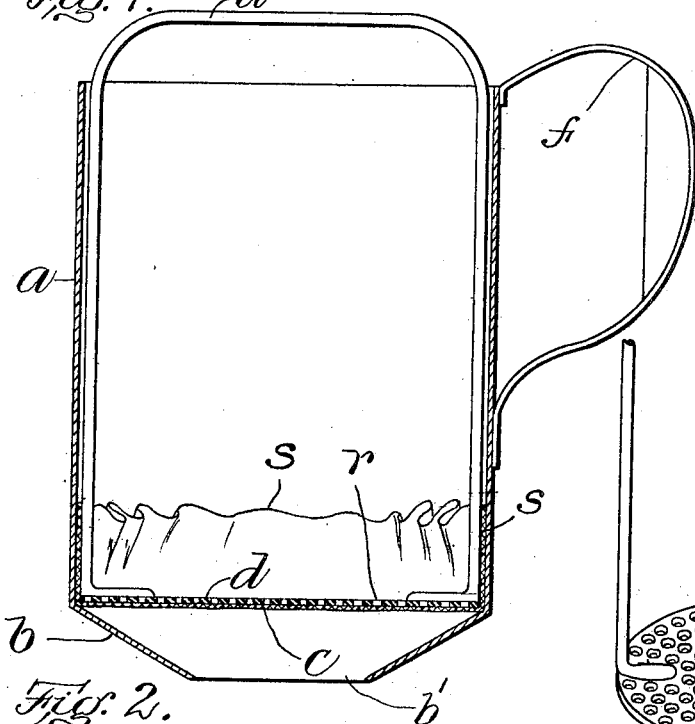
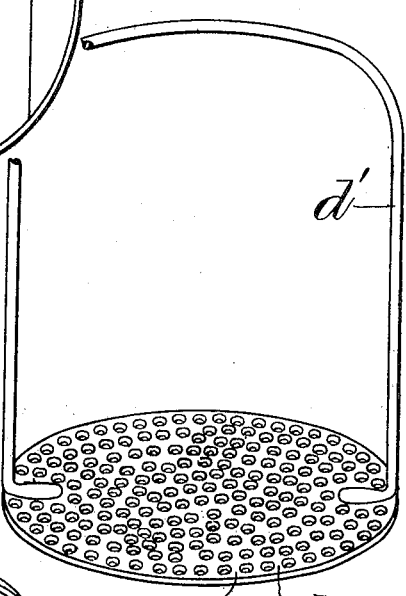
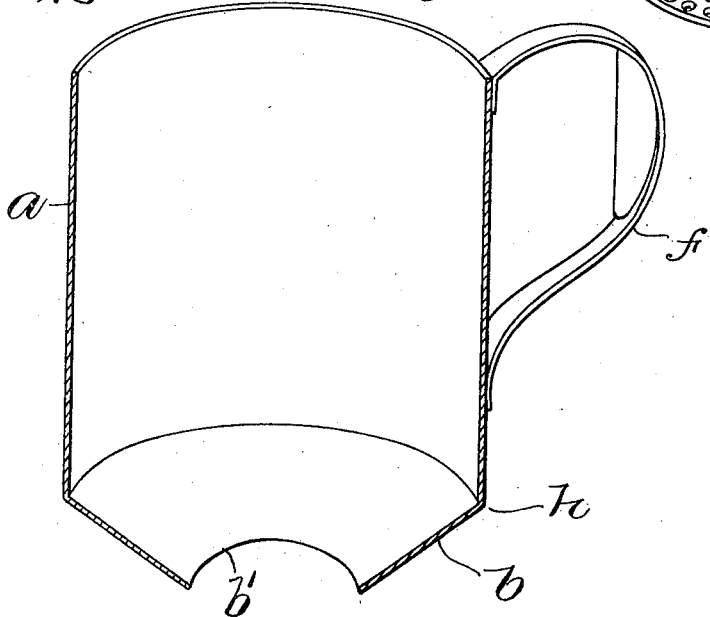
Witnesses:
L. E. Kennedy
P. W. Pezzetti
Inventor:
F. B. Maynard,
by Wright Brown Quinby & May
Attorneys.

UNITED STATES PATENT OFFICE.

FRED B. MAYNARD, OF BOSTON, MASSACHUSETTS.

APPARATUS FOR MAKING COFFEE.

No. 828,674.  Specification of Letters Patent.  Patented Aug. 14, 1906.

Application filed July 3, 1905. Serial No. 268,183.

*To all whom it may concern:*

Be it known that I, FRED B. MAYNARD, of Boston, in the county of Suffolk and State of Massachusetts, have invented certain new and useful Improvements in Apparatus for Making Coffee, of which the following is a specification.

This invention relates to a new and improved apparatus for making coffee.

Figure 1 is a vertical sectional view of an apparatus constructed in accordance with my invention, showing the construction and relative arrangement of the cylindrical dish, the perforated diaphragm, and the strainer. Fig. 2 is a vertical sectional view of the cylindrical dish. Fig. 3 is a perspective view of the diaphragm and its handle.

In the form of apparatus illustrated in the drawings, $a$ represents a cylindrical dish of any desired shape and capacity and of any metal or material suitable to withstand the action of hot water and liquid coffee. This dish, as shown, is open at both ends and formed at its lower end with a funnel or spout $b$, having a relatively restricted opening $b'$, enabling the dish to be placed upon a cup, urn, &c., and direct the contents of the dish into said cup or other receptacle. The dish may be provided with a handle $f$. The angle $h$, formed by the walls of the spout $b$ and the dish $a$, serves as a support for the diaphragm $d$ and strainer $c$, as shown in Fig. 1. Such support may be secured by forming a ring in the wall of the dish or any other preferred way. The diaphragm $d$ is composed of any metal or material suitable to withstand the action of hot water and coffee liquid and retain its shape and resilience. This diaphragm, as shown, is circular in shape to conform to the walls of the dish $a$, and, further, is provided with a series of perforations $r$ of a size to permit the ready passage therethrough of water and coffee dust or powder, but to prevent the passage of grains of ground coffee. As shown, the diameter of the diaphragm $d$ is slightly less than that of the dish $a$. The handle $d'$ serves as a means whereby the diaphragm may be inserted into and removed from the dish. In connection with the perforated diaphragm I make use of a strainer $c$, of canton-flannel or any other suitable material that will permit the passage of liquid therethrough, but will prevent the passage of coffee dust or powder, the latter passing through the perforations $r$, but being stopped by the strainer $c$.

The operation of my improved apparatus is as follows: The strainer $c$ is placed over the upper end of the dish $a$. The diaphragm $d$ is then placed upon the strainer $c$ and the two pushed together down into the dish until they seat against the angle $h$ or other support with the diaphragm $d$ above the strainer $c$, the latter being held evenly and taut by the former, the margin or skirt $s$ of the strainer $c$ lying against the wall of the dish. The required amount of ground coffee is then placed in the dish on the diaphragm and the latter shaken to even the surface of the coffee, causing the latter to have a uniform depth, the required amount of boiling water percolating through the granulated coffee and the liquid coffee passing through the opening $b'$ into said cup, urn, or other receptacle. The diaphragm prevents the sagging of the strainer $c$, maintaining a uniform depth of ground or pulverized coffee, and prevents the passage of the grounds of coffee, the coffee dust and powder being caught and contained by the strainer $c$. In this way the diaphragm and strainer each perform their respective functions, each coöperating with instead of interfering with the other's operation. The strainer being close to the diaphragm, the liquid passing through the perforations $r$ is evenly distributed upon the strainer $c$, causing a uniform and reliable action at all times, the liquid coffee passing to the spout $b$ free from grounds or sediment. The strainer and diaphragm, with the coffee-grounds, are easily removed by means of the handle $b'$.

Having thus explained the nature of my invention and described a way of constructing and using the same, though without attempting to set forth all of the forms in which it may be made or all of the modes of its use, what I claim, and desire to secure by Letters Patent, is—

1. An apparatus for making coffee, comprising a cylindrical receptacle formed at one end with a shoulder or abutment, a circular perforated diaphragm arranged in said receptacle against said shoulder with its periphery in close engagement with the wall of said receptacle, and a cloth strainer arranged beneath said diaphragm with its edge between said shoulder and said diaphragm, whereby the strainer is relieved of the weight of water and superimposed mass of coffee and the liquid coffee and coffee-dust are evenly admitted to the strainer.

2. An apparatus for making coffee, comprising a cylindrical receptacle formed at one end with a shoulder or abutment, a circular perforated diaphragm arranged in said receptacle against said shoulder, with its periphery in close engagement with the wall of said receptacle, a cloth strainer arranged beneath said diaphragm with its edge between said diaphragm and said shoulder, and a handle having two legs attached to the said diaphragm near its periphery and at substantially one hundred and eighty degrees apart, whereby the said strainer is maintained taut under the diaphragm and the strainer and diaphragm can be readily inserted and removed.

In testimony whereof I have affixed my signature in presence of two witnesses.

FRED B. MAYNARD.

Witnesses:
H. L. ROBBINS,
C. F. BROWN.